(No Model.)
B. W. GRIST.
PIPE HANGER.
No. 569,755. Patented Oct. 20, 1896.
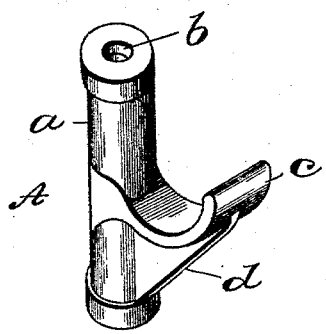
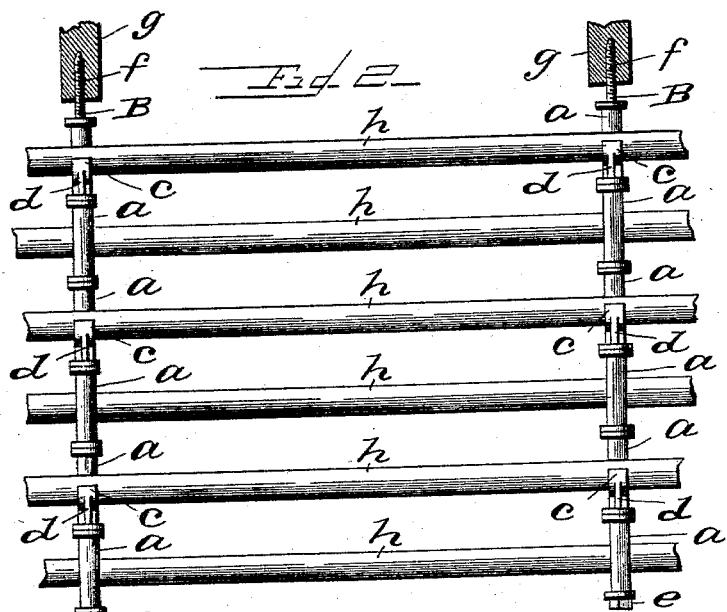
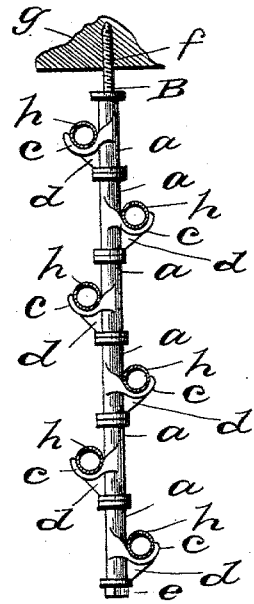
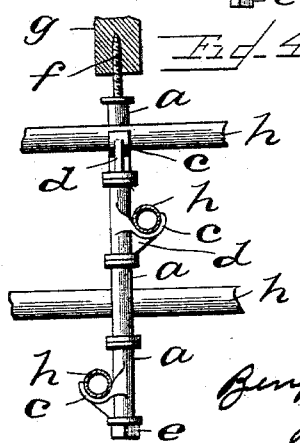
Witnesses
G. A. Tauberschmidt
D. Weimer Reinohl
Inventor
Benjamin W. Grist
By D. G. Reinohl
Attorney

UNITED STATES PATENT OFFICE.

BENJAMIN W. GRIST, OF PHILADELPHIA, PENNSYLVANIA, ASSIGNOR TO THE PENNSYLVANIA IRON WORKS COMPANY, OF SAME PLACE.

PIPE-HANGER.

SPECIFICATION forming part of Letters Patent No. 569,755, dated October 20, 1896.

Application filed February 14, 1895. Serial No. 538,427. (No model.)

*To all whom it may concern:*

Be it known that I, BENJAMIN W. GRIST, a citizen of the United States, residing at Philadelphia, in the county of Philadelphia and State of Pennsylvania, have invented certain new and useful Improvements in Pipe-Hangers; and I do hereby declare the following to be a full, clear, and exact description of the invention, such as will enable others skilled in the art to which it appertains to make and use the same.

My present invention relates to means for hanging, supporting, or suspending pipes for cold-storage, steam or hot-water heating, and other purposes in which pipes in multiple are used, has for its object certain improvements whereby pipes may be supported in different planes and angles to each other; and it consists in the constructions which will be fully disclosed in the following specification and claims.

In the accompanying drawings, which form part of this specification, Figure 1 represents a perspective of a pipe-hanger of my improved construction detached and on an enlarged scale; Fig. 2, a side elevation showing a group of pipes parallel to each other; Fig. 3, a vertical transverse section of the same, and Fig. 4 an elevation showing two pipes at a right angle to other two pipes and two of the pipes in transverse section.

Reference being had to the drawings and the letters thereon, A indicates the hanger, which consists of an elongated body *a*, having a hole or passage *b* extending through said body, and provided with a hook *c*, which may be strengthened by a bracket *d* under the hook.

B indicates a bolt having a head *e* on one end and screw-threaded at *f* at the opposite end for screwing the bolt into a joist or beam *g*, from which to suspend a group of pipes *h*.

The pipes *h* may be assembled in any form desired by turning the hangers A axially upon the bolt or rod B, so that they may be parallel to each other, or one group may be placed at a right or any other angle to another group of pipes.

The length of the body *a* determines the distance between the pipes suspended upon the hangers in groups, and said length may be varied to suit position or circumstances of use, and the passage *b* through the body *a* is at a right angle to the plane of the hook *c* in whatever position the hangers may be assembled upon the bolt or rod B.

Having thus fully described my invention, what I claim is—

1. A pipe-hanger comprising a tubular body having between its ends a supporting device located at a distance from one end greater than the diameter of the pipe to be supported.

2. A pipe-hanger comprising a tubular body having between its ends a supporting device located at a distance from one end greater than the diameter of the pipe to be supported and a bracket between the under side of the supporting device and body.

3. A pipe-hanger comprising a tubular body having between its ends a supporting device located at a distance from one end greater than the diameter of the pipe to be supported, in combination with a bolt or rod extending through said body.

In testimony whereof I affix my signature in presence of two witnesses.

BENJAMIN W. GRIST.

Witnesses:
HOWLAND CIST,
J. R. BENNINGTON.